(12) United States Patent
Jeppesen et al.

(10) Patent No.: US 11,530,683 B2
(45) Date of Patent: Dec. 20, 2022

(54) VELOCITY FEEDFOWARD CONTROL OF A HYDRAULIC PITCH SYSTEM

(71) Applicant: VESTAS WIND SYSTEMS A/S, Aarhus (DK)

(72) Inventors: Christian Jeppesen, Aarhus (DK); Fabio Caponetti, Åbyhøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 76 days.

(21) Appl. No.: 17/251,600

(22) PCT Filed: Jun. 7, 2019

(86) PCT No.: PCT/DK2019/050179
§ 371 (c)(1),
(2) Date: Dec. 11, 2020

(87) PCT Pub. No.: WO2019/238187
PCT Pub. Date: Dec. 19, 2019

(65) Prior Publication Data
US 2021/0246872 A1   Aug. 12, 2021

(30) Foreign Application Priority Data
Jun. 11, 2018   (DK) .......................... PA 2018 70339

(51) Int. Cl.
*F03D 7/02* (2006.01)
*F03D 7/04* (2006.01)

(52) U.S. Cl.
CPC ............ *F03D 7/0224* (2013.01); *F03D 7/046* (2013.01); *F05B 2270/328* (2013.01); *F05B 2270/604* (2013.01)

(58) Field of Classification Search
CPC ........ F03D 7/0224; F03D 7/046; F03D 7/043; F05B 2270/328; F05B 2270/604
(Continued)

(56) References Cited

U.S. PATENT DOCUMENTS

| | | | |
|---|---|---|---|
| 10,570,881 B2 * | 2/2020 | Egedal | F03D 7/0228 |
| 2010/0117361 A1 * | 5/2010 | Christensen | F03D 7/0224 |
| | | | 290/44 |

(Continued)

FOREIGN PATENT DOCUMENTS

| | | |
|---|---|---|
| EP | 2757256 A2 | 7/2014 |
| EP | 3070327 A1 | 9/2016 |

(Continued)

OTHER PUBLICATIONS

PCT International Search Report for Application No. PCT/DK2019/050179 dated Aug. 30, 2019.

(Continued)

*Primary Examiner* — J. Todd Newton
(74) *Attorney, Agent, or Firm* — Patterson + Sheridan, LLP

(57) ABSTRACT

Embodiments herein describe a hydraulic pitch system where a velocity (e.g., the velocity of a hydraulic cylinder or the piston rod in the cylinder) is fed forward and combined with a setting outputted by a pitch controller. The velocity of the hydraulic cylinder is derived from the reference pitch angle or a continuous pitch signal (e.g., a cyclic pitch or ramp rate) in the control system. In either case, the velocity can be determined by monitoring the change in the reference pitch angle or the continuous pitch signal. Using a gain control, the velocity is converted into a position setting of the hydraulic pitch system (e.g., a spool setting in a valve) which is combined with another position setting generated by the pitch controller.

20 Claims, 6 Drawing Sheets

(58) Field of Classification Search
USPC .............................................. 416/1
See application file for complete search history.

(56) References Cited

U.S. PATENT DOCUMENTS

| | | | |
|---|---|---|---|
| 2011/0229300 A1* | 9/2011 | Kanev | F03D 7/043 |
| | | | 415/33 |
| 2012/0061962 A1 | 3/2012 | Nagasaki | |
| 2012/0078518 A1* | 3/2012 | Krishna | G06Q 50/06 |
| | | | 702/3 |
| 2014/0169964 A1* | 6/2014 | Kumar | F03D 7/0224 |
| | | | 416/1 |

FOREIGN PATENT DOCUMENTS

| | | |
|---|---|---|
| WO | 2012102623 A1 | 8/2012 |
| WO | 2019238187 A1 | 12/2019 |

OTHER PUBLICATIONS

Yin Xiu-Xing et al., "Modeling and loading Compensation of a Rotary Valve-Controlled Pitch System for Wind Turbines," Journal of Zhejiang University Science, vol. 18, No. 9, Sep. 8, 2017, pp. 718-727.

Irizar Victor et al., "Hydraulic Pitch Control System for Wind Turbines: Advanced Modeling and Vertification ofan Hydraulic Accumulator," Simulation Modeling Practive and Theory, vol. 79. Sep. 1, 2017, pp. 1-22.

PCT Written Opinion of the International Searching Authority for Application No. PCT/KD2019/050179 dated Aug. 30, 2019.

Danish Patent and Trademark Office 1st Technical Examination for Application No. PA 2018 70339 dated Nov. 26, 2018.

* cited by examiner

VELOCITY FEEDFOWARD CONTROL OF A HYDRAULIC PITCH SYSTEM

BACKGROUND

Field of the Invention

Embodiments presented in this disclosure generally relate to feed-forwarding a velocity associated with a hydraulic cylinder when controlling a hydraulic pitch system that sets a pitch angle of a wind turbine blade.

Description of the Related Art

Many wind turbines use a hydraulic pitch system to control the pitch angles of the rotor blades in order to optimize wind energy production and to ensure that the rotor blades are not subjected to extreme loads during strong winds. Each blade has a pitching arrangement that includes a pitch bearing between a rotor hub and the blade, and a pitching mechanism in the form of a hydraulic actuator that provides force for pitching the blade and maintaining it in a given position. This hydraulic actuator is typically powered by a hydraulic pump and a hydraulic valve.

SUMMARY

One embodiment of the present disclosure is a method of controlling a pitch of a blade in a wind turbine. The method includes receiving a reference pitch angle, comparing at least one of the reference pitch angle and a signal derived therefrom to an actual setting of the wind turbine to output a pitch error signal, and generating, based on the pitch error signal, a first setting for a hydraulic cylinder, where the hydraulic cylinder controls the pitch of the blade. The method also includes generating a second setting for the hydraulic cylinder using a feed-forward path where the second setting is based on a velocity of the hydraulic cylinder, combining the first and second settings to output a combined setting, and controlling the hydraulic cylinder based on the combined setting.

Another embodiment described herein is a control system for controlling a pitch of a blade in a wind turbine. The control system includes a hydraulic cylinder configured to control the pitch of the blade, a first summation module configured to compare at least one of a reference pitch angle and a signal derived therefrom to an actual setting of the wind turbine to output a pitch error signal, a pitch controller configured to generate, based on the pitch error signal, a first setting for the hydraulic cylinder, a feed-forward path configured to generate a second setting for the hydraulic cylinder where the second setting is based on a velocity of the hydraulic cylinder. The control system further includes a second summation module configured to combine the first and second settings to output a combined setting and hydraulic controls configured to control the hydraulic cylinder based on the combined setting.

Another embodiment described herein is a computer-readable storage medium storing instructions, which, when executed on a processor, perform an operation for controlling a pitch of a blade in a wind turbine, the operation includes receiving a reference pitch angle, comparing at least one of the reference pitch angle and a signal derived therefrom to an actual setting of the wind turbine to output a pitch error signal, and generating, based on the pitch error signal, a first setting for a hydraulic cylinder, where the hydraulic cylinder controls the pitch of the blade. The operation also includes generating a second setting for the hydraulic cylinder using a feed-forward path where the second setting is based on a velocity of the hydraulic cylinder, combining the first and second settings to output a combined setting, and controlling the hydraulic cylinder based on the combined setting.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Embodiments herein describe a hydraulic pitch system where a velocity (e.g., the reference velocity of a hydraulic cylinder or the piston rod in the cylinder) is fed forward and combined with a setting outputted by a pitch controller. Establishing the feed forward path can reduce the bandwidth used in a feedback loop where a measured value (e.g., an actual value) corresponding to the pitch angle is used to generate a pitch error signal. In one embodiment, the wind turbine includes a pitch sensor directly on the blade rod which provides a more accurate measure of the pitch angle relative to estimating the pitch angle using sensors in the hydraulic pitch system. Although the pitch angle is more accurate, placing a sensor on the blade introduces structural dynamics that increase the bandwidth used in the feedback loop. However, feeding forward the reference velocity reduces the bandwidth in the feedback loop and mitigates any negative impact caused by the structural dynamics. As a result, the wind turbine control system can react faster to changes in the environment (e.g., changes in the wind speed) and changes to control signals (e.g., changes in a blade pitch reference signal).

The reference velocity of the hydraulic cylinder (or other type of hydraulic actuator) can be derived from the reference pitch angle or a continuous pitch signal (e.g., a cyclic pitch or ramp rate) in the control system. In either case, the reference velocity can be determined by monitoring the change in the reference pitch angle or the continuous pitch signal. Using a gain control, the velocity is converted into a position setting of the hydraulic pitch system (e.g., a spool setting in a valve) which is combined with another position setting generated by a pitch controller. In this manner, the reference velocity is fed forward which may reduce the bandwidth requirements of a corresponding feedback loop in the control system that provides an actual position setting of the hydraulic pitch system.

Example Embodiments

Figure 1:
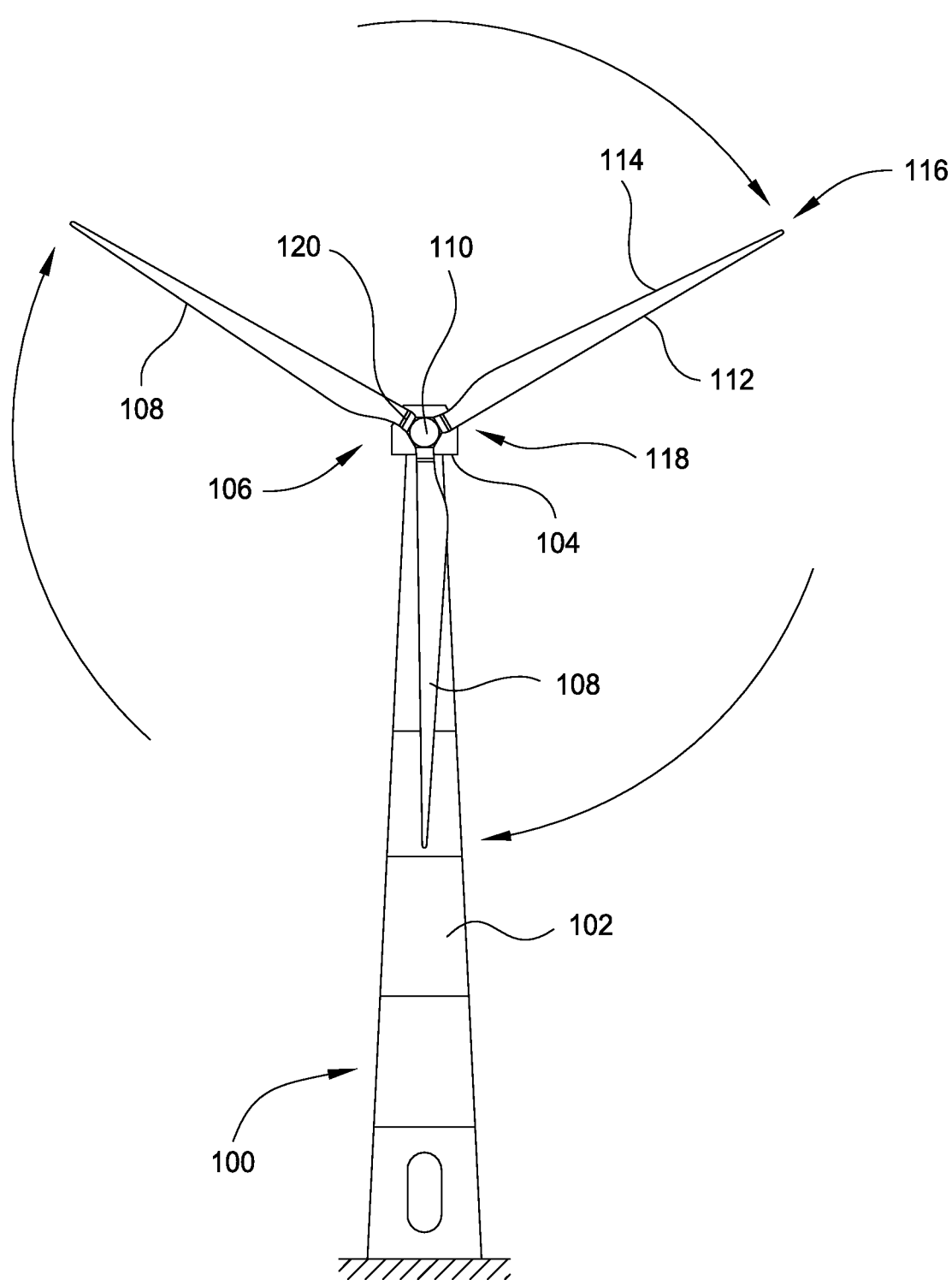
FIG. 1 illustrates a diagrammatic view of a wind turbine, according to an embodiment described in this present disclosure.

FIG. 1 illustrates a diagrammatic view of a horizontal-axis wind turbine generator 100. The wind turbine generator 100 typically comprises a tower 102 and a wind turbine nacelle 104 located at the top of the tower 102. A wind turbine rotor 106 may be connected with the nacelle 104 through a low speed shaft extending out of the nacelle 104. The wind turbine rotor 106 comprises three rotor blades 108 mounted on a common hub 110 which rotate in a rotor plane, but may comprise any suitable number of blades, such as one, two, four, five, or more blades. The blades 108 (or airfoil) typically each have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 relative to the rotor plane may be controlled by linear actuators, hydraulic actuators, or stepper motors, for example, connected between the hub 110 and the blades 108.

Figure 2:
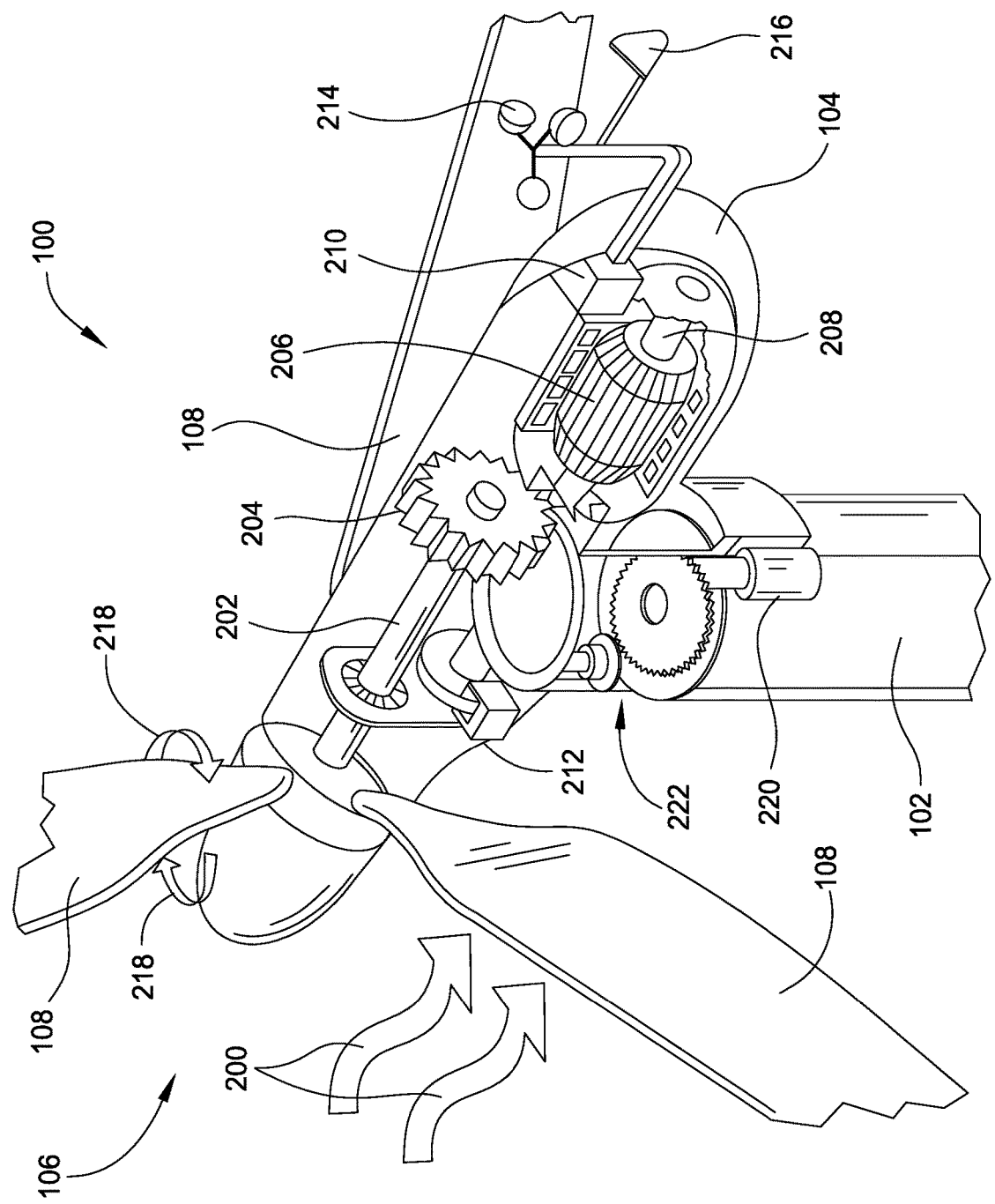
FIG. 2 illustrates a diagrammatic view of the components internal to the nacelle and tower of a wind turbine, according to an embodiment described in this present disclosure.

FIG. 2 illustrates a diagrammatic view of typical components internal to the nacelle 104 and tower 102 of a wind turbine generator 100. When the wind 200 pushes on the blades 108, the rotor 106 spins and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 106—i.e., reduces the revolutions per minute (RPM). The braking system 212 may prevent damage to the components of the wind turbine generator 100. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades using, for example, a hydraulic pitch system. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
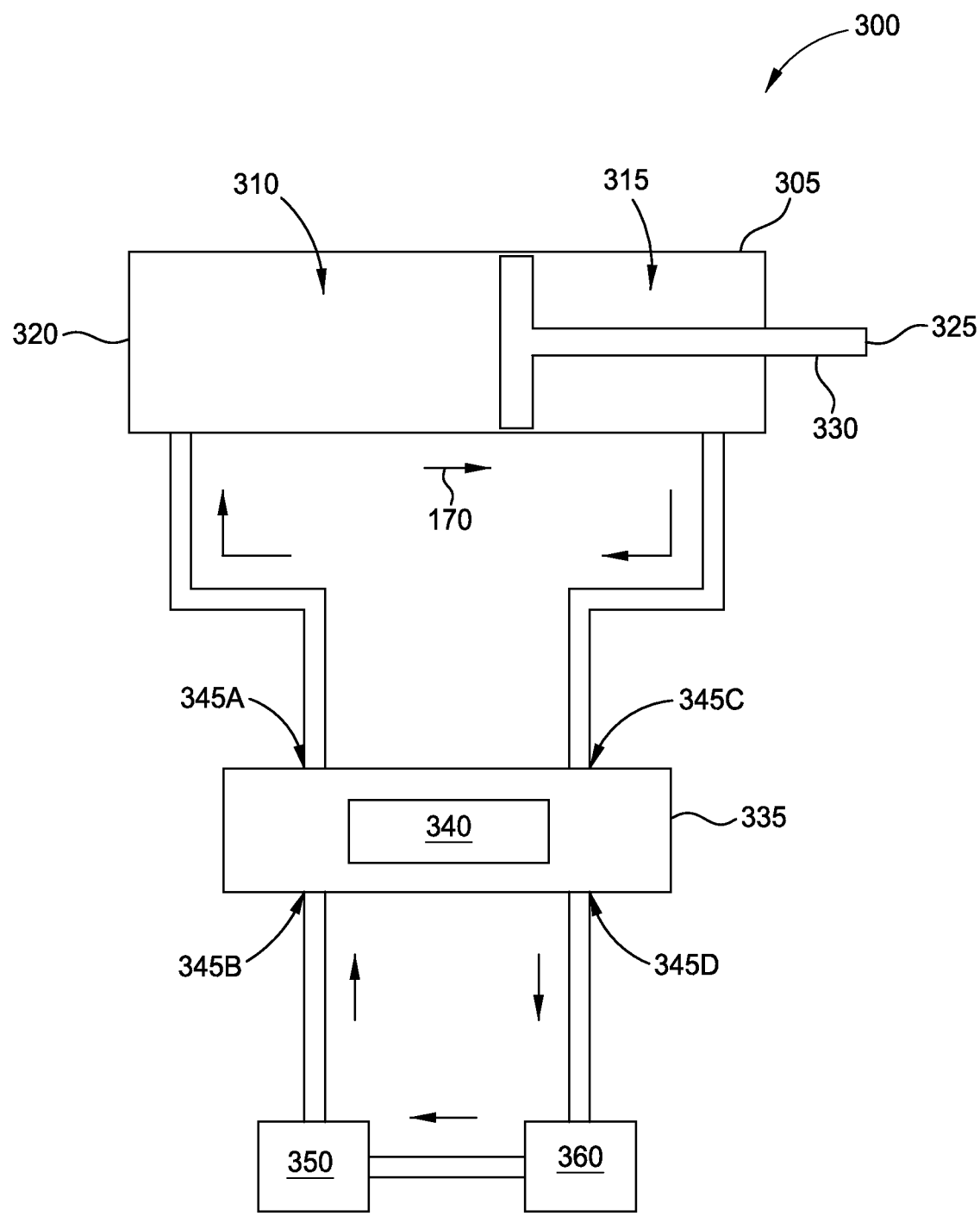
FIG. 3 illustrates a diagram of a hydraulic pitch system, according to an embodiment described in this present disclosure.

FIG. 3 illustrates a diagram of a hydraulic pitch system 300, according to an embodiment described in this present disclosure. The system 300 includes a hydraulic cylinder 305 through which a piston rod 330 extends (also referred to as simply a "piston 330"). The hydraulic cylinder 305 is divided into two chambers depending on the location of the piston 330: Chamber A 310 and Chamber B 315. That is, the left end of the piston rod 330 divides Chamber A 310 from Chamber B 315. Thus, as the piston 330 moves left to right or right to left, the piston 330 changes the size of the chambers. For example, moving the piston 330 to the right as shown by the arrow 170 increases the size of the Chamber A 310 but decreases the size of Chamber B 315.

The hydraulic cylinder 305 includes a first end 325 and a second end 320 (disposed on a distal end of the piston 330). In one embodiment, the first end 325 (which is part of the piston 330) is coupled to a blade actuator which changes the pitch of a wind turbine blade relative to the rotor hub. The second end 320 of the cylinder 305 may be fixably attached to a portion of the hub such that the second end 320 does not move while the piston 330 travels in and out of the cylinder 305. Alternatively, the second end 320 may be coupled to a blade actuator while the first end 325 remains stationary.

The position of the cylinder 305 controls the pitch of the blade. That is, for each position of the cylinder 305 (or more specifically, the position of the piston 330 in the hydraulic cylinder 305) there is a corresponding pitch angle of the blade. Thus, by moving the cylinder 305, the wind turbine controller can set the pitch of the blade.

To move the piston 330, the system 300 includes a valve 335, a pump 350, and a tank 360. The pump 350 pressurizes a hydraulic fluid (e.g., hydraulic oil) in the system 300. In this example, the pump 350 pumps the fluid towards the valve 335 (e.g., a proportional valve) which includes a spool 340 for directing the fluid either to Chamber A 310 or to Chamber B 315. In FIG. 3, the spool 340 is set to direct the fluid received from the pump 350 to Chamber A 310 as shown by the arrows. That is, the spool 340 directs the fluid received at port 345B to port 345A. As a result, the hydraulic fluid pushes the piston 330 to the right as shown by the arrow 170. The hydraulic fluid exits from Chamber B 315, flows into the valve 335 at port 345C, exits the valve 335 at port 345D, and flows into the tank 360.

This process can be reversed to move the piston 330 in the opposite direction of the arrow 170. That is, the setting of the spool 340 can change such that fluid received from the pump 350 at port 345B exits at port 345C and enters Chamber B 315. This then moves the piston 330 to the left thereby increasing Chamber B 315 and reducing Chamber A 310. The fluid flowing out of Chamber A 310 enters the port 345A and exits the port 345D as it flows into the tank 360. In this manner, the valve 335, and more specifically, the position of the spool 340 in the valve 335, controls the flow of the hydraulic fluid into and out of the Chambers A and B which controls the position of the piston 330 and the pitch of the blade.

Figure 4:
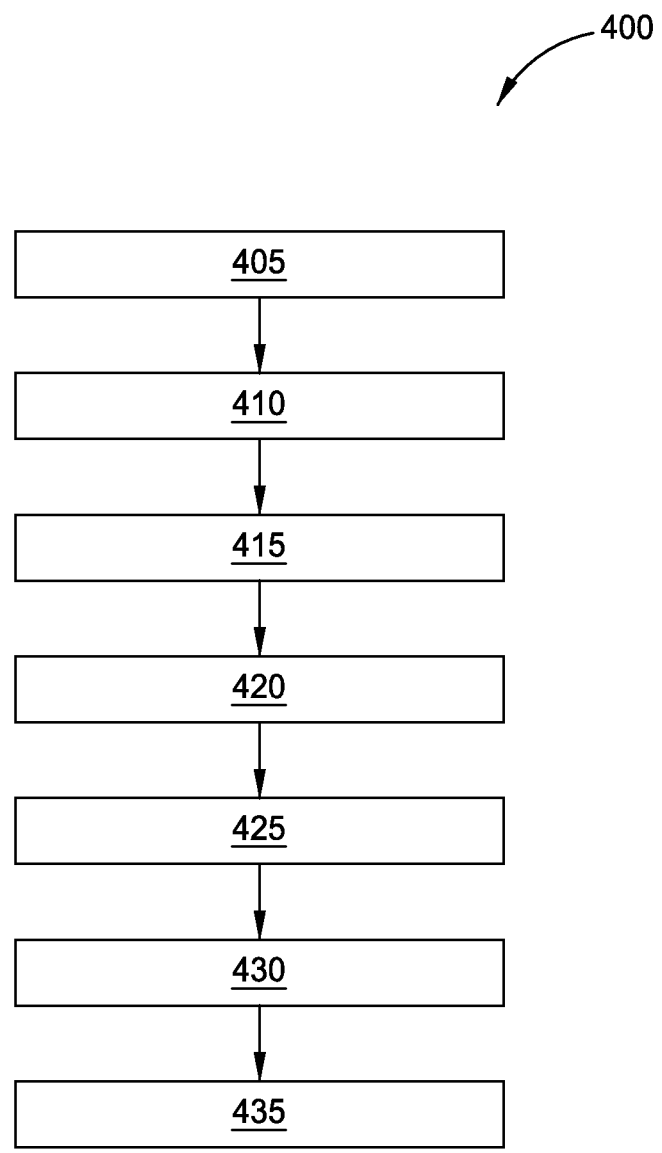
FIG. 4 is a flowchart for controlling a hydraulic pitch system using a fed-forward reference velocity, according to an embodiment described in this present disclosure.

FIG. 4 is a flowchart of a method 400 for controlling a hydraulic pitch system (such as the one illustrated in FIG. 3) using a feed-forward velocity, according to an embodiment described in this present disclosure. For clarity, FIG. 4 is discussed in tandem with a blade pitch control system 500 illustrated in FIG. 5. Generally, the control system 500 in FIG. 5 can control a hydraulic pitch system using a feed-forward velocity, according to an embodiment described in this present disclosure.

At block 405 of method 400, the blade pitch control system 500 receives a reference pitch angle ($\theta_{ref}$) from an upstream control system (e.g., a wind turbine controller for controlling the overall wind turbine, or a wind plant controller which controls a plurality of wind turbines in a plant). Generally, the reference pitch angle indicates a desired pitch angle of the blades. The reference pitch angle may change due to changing wind conditions or changing demand for power in the grid.

Figure 5:
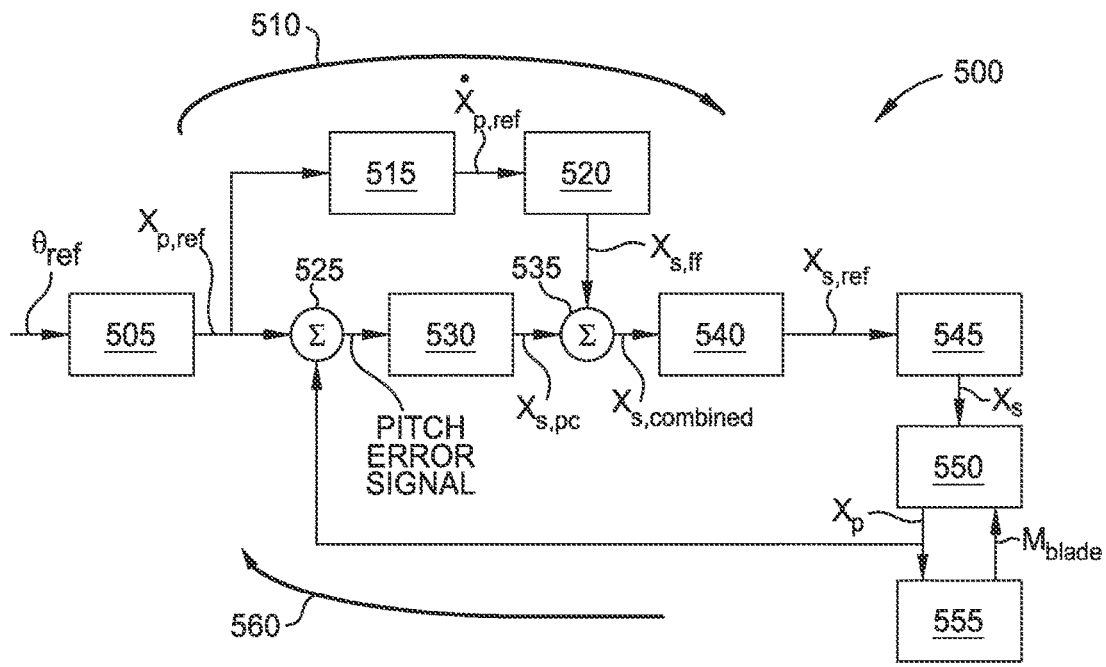
FIG. 5 illustrates a control system for controlling a hydraulic pitch system using a fed-forward velocity, according to an embodiment described in this present disclosure.

At block 410, the control system 500 converts the reference pitch angle to a position setting of the hydraulic cylinder ($x_{p,ref}$). Although a hydraulic cylinder is specifically described, the embodiments herein can be used with any type of hydraulic actuator that sets the pitch angle of a wind turbine blade. In FIG. 5, a position converter 505 converts the reference pitch angle to a reference position setting of the hydraulic cylinder. In one embodiment, each reference pitch angle corresponds to a particular position of the hydraulic cylinder relative to the piston. For example, to achieve a particular blade pitch (e.g., 3 degrees), there is a corresponding position setting of the hydraulic cylinder and piston where moving the cylinder and piston relative to each other results in the desired blade pitch. The position converter 505 may store a mapping between the reference pitch angles and the position settings of the hydraulic cylinder.

At block 415, the control system 500 compares the position setting to an actual position setting of the hydraulic cylinder to output a pitch error signal. As shown in FIG. 5, the control system 500 includes a summation module 525 which receives the position setting ($x_{p,ref}$) from the position converter 505 and the actual setting (which can be measured or derived) of the position of the hydraulic cylinder ($x_p$) using a feedback loop 560. Put differently, the feedback loop 560 permits the current value of the position setting ($x_p$) of the hydraulic cylinder to be fed back and compared to the desired or reference value of the position setting ($x_{p,ref}$). The pitch error signal outputted by the summation module 525 represents the difference between the current value of the position setting and the desired value of the position setting.

At block 420, the control system 500 generates a first position setting for the hydraulic cylinder using the pitch error signal. In FIG. 5, this is performed by a pitch controller 530 that receives the pitch error signal and outputs the first position setting. In this example, the pitch controller 530 outputs a valve spool position ($x_{s,pc}$). That is, in this embodiment, the first position setting is a position setting for the spool in the valve that controls the flow of hydraulic fluid into the hydraulic cylinder. While FIG. 5 illustrates controlling the position of the hydraulic cylinder using the position of the spool, the embodiments herein are not limited to such and can use any technique for controlling the position setting of a hydraulic cylinder.

At block 425, the control system 500 generates a second position setting for the hydraulic cylinder using a feed-forward path 510. As mentioned above, using a feed-forward path 510 that feeds forward velocity reduces the bandwidth in the feedback loop 560. As a result, the wind turbine control system can react faster to changes in the environment (e.g., changes in the wind speed) and changes to control signals (e.g., changes in the reference blade pitch).

In FIG. 5, the feed-forward path 510 includes a velocity calculator 515 and a gain control 520. The velocity calculator 515 receives the reference position setting of the hydraulic cylinder ($x_{p,ref}$) and generates a reference velocity of the hydraulic cylinder (or a reference velocity of the piston rod in the cylinder) ($\dot{x}_{p,ref}$). In one embodiment, this reference velocity is calculated by comparing the current desired position setting to at least one previous desired position setting. For example, the velocity calculator 515 may store values of previous position settings derived from previous pitch reference signals. In one embodiment, the velocity calculator 515 performs a backward Euler approximation using the current position setting and a previous (or historical) position setting or settings to derive the reference velocity. Although a backward Euler approximation is specifically mentioned, the velocity calculator 515 can use any control algorithm or technique to derive the reference velocity using current and historical values of a control setting (e.g., a reference pitch angle or a position setting of the hydraulic cylinder).

The reference velocity of the hydraulic cylinder is then provided to the gain control 520 which modifies the reference velocity using a flow gain of the hydraulic cylinder to output a second position setting of the cylinder—e.g., a valve spool position ($x_{s,ff}$) generated using the feed-forward path 510. However, the hydraulic cylinder may lack sensors which can accurately measure the flow gain. In one embodiment, the hydraulic cylinder has a sensor in only one of the chambers (i.e., only Chamber A or Chamber B but not both) which means a flow gain cannot be accurately measured. As such, the gain control 520 may estimate the flow gain in order to generate the valve spool position ($x_{s,ff}$).

Before estimating the flow gain, a brief description of the relationship of the valve spool position and the flow of the hydraulic fluid in the hydraulic cylinder is provided. Equation 1 indicates that the flow into a chamber of a hydraulic cylinder (Chamber A in this example) yields a cylinder movement by the following relationship:

$$\dot{x}_p \cdot A_A = Q_A \quad (1)$$

In Equation 1, $\dot{x}_p$ is the velocity of the cylinder, $A_A$ is the cross sectional area of Chamber A in the cylinder, and $Q_A$ is the flow of the hydraulic fluid into Chamber A. The flow can also be expressed as follows when the valve spool position connects the pump to Chamber A:

$$Q_A = C_D A(x_s) \sqrt{\frac{2}{\rho}(P_s - P_A)} \quad (2)$$

In Equation 2, $x_s$ is the valve spool position, $A(x_s)$ is the area of the spool opening at that position, $P_s$ is the pump pressure, $P_A$ is the pressure in Chamber A, and $C_D$ is a scalar discharge coefficient. While Equation 2 defines the flow into and out of the Chamber A (and a similar equation could be written for Chamber B), the equation is non-linear. Instead, a linear approximation of Equation 2 may be used to identify a linear gain to calculate what the spool opening should be for a given cylinder velocity. This is illustrated in Equations 3 and 4.

$$\widetilde{Q}_A = \frac{\partial Q_A}{\partial x_s}\bigg|_{x_{s,0}, P_{A,0}} \quad (3)$$

$$\widetilde{Q}_A \approx K_q \tilde{x}_s \quad (4)$$

In Equation 3, it may be assumed that the pressure in Chamber A does not change (i.e., $P_{A,0}$) so that the approximation in Equation 4 can be made. However, this is an oversimplification since the pressure in Chamber A can change depending on the operating conditions of the wind turbine which is why Equation 4 is an approximation or estimate (as indicated by the ~) of the valve spool position. Nonetheless, using Equation 4, Equation 1 can be reformatted to:

$$\dot{x}_{cyl} \cdot A_A = K_q x_s \quad (5)$$

In Equation 5, $\dot{x}_{cyl}$ is the velocity of the hydraulic cylinder for a given operating point and $K_q$ is a gain value which can vary depending on the particular hydraulic cylinder being used. For example, in some hydraulic systems, the gain value is the same when moving in both directions. However, in other systems, the gain value varies depending on the direction the piston is moving.

Equation 5 can be rearranged to yield:

$$x_s = \frac{A_A}{K_q} \dot{x}_p \quad (6)$$

Using Equation 6, the velocity of the hydraulic cylinder ($\dot{x}_p$) can be used to identify a valve spool position. As such, the output of the gain control 520 in FIG. 5 (i.e., $x_{s,ff}$) can be represented by:

$$x_{s,ff} = \frac{A_A}{K_q} \dot{x}_{p,ref} = K_{ff} \dot{x}_{p,ref} \text{ where } K_{ff} = \frac{A_A}{K_q} \quad (7)$$

In Equation 7, $K_{ff}$ is the approximate or estimated flow gain of Chamber A in the hydraulic cylinder. In one embodiment, the flow gain is different when the hydraulic cylinder moves in different directions as is often the case in hydraulic systems where the valve and cylinder areas are unmatched. For example, both $A_A$ and $K_q$ may be different depending on the direction of movement of the piston rod. As such, the control gain 520 may store two values of the flow gain which are applied depending on the current direction the piston is moving. Stated differently, the gain control 520 may use different flow gains depending on whether the reference velocity is positive or negative. However, for other hydraulic cylinders, $K_q$ is the same in both directions which may be the case when the valve and cylinder areas are matched. However, the pressure in Chamber A ($P_A$) may be different than the pressure in Chamber B ($P_B$) that can nonetheless yield a different gain value $K_q$ which changes the value of the flow gain $K_{ff}$. In any case, Equation 7 illustrates that using a predefined flow gain (which may be calculated when the wind turbine is first set up or initially configured) and the current reference velocity, the gain control 520 can generate a spool position value $x_{s,ff}$ for that velocity.

Although block 425 is described as using a reference velocity to generate a second position setting for the hydraulic cylinder using a feed-forward path 510, the control system 500 may also use a reference acceleration of the hydraulic cylinder to generate the second position setting. For example, the reference acceleration could be filtered to obtain a signal similar to the reference velocity which can be passed to the gain control 520 to generate a spool position value $x_{s,ff}$.

At block 430, the control system 500 combines the first and second settings to output a combined setting. In FIG. 5, the first setting (e.g., the spool position value $x_{s,pc}$) is combined with the second setting (e.g., spool position value $x_s$,ff) by a summation module 535 to yield a combined setting $x_{s,combined}$. In this manner, the fed forward value (e.g., the spool position value $x_{s,ff}$) can be generated without relying on the fed back position value of the pitch system—e.g., the actual position of the hydraulic cylinder $x_p$. Once the pitch controller 530 outputs its control setting (e.g., the spool position value $x_{s,pc}$) this value is then combined with the spool position value provided by the feed-forward path 510. This combined value $x_{s,combined}$ represents the control setting for the spool which moves the cylinder to the desired position at the corresponding reference velocity while taking into account the feedback loop 560 which mitigates disturbances and uncertainty that can occur in the feed-forward path 510.

At block 435, the control system 500 controls the hydraulic cylinder using the combined setting. In the example shown in FIG. 5, the system 500 controls the position or opening on the spool in the value which affects the flow of hydraulic fluid in the cylinder, thereby changing the position of the piston rod in the cylinder. As shown, the output of the summation module 535 is provided to a spool reference generator 540 which calculates a valve spool position reference $x_{s,ref}$. In one embodiment, the spool reference generator 540 includes a dead band compensator which adjusts $x_{s,combined}$ to compensate for a dead band where flow does not change (e.g., −10% to 10%).

The output of the spool reference generator 540 is provided to valve controls 545 that adjust the spool valve position according to $x_{s,ref}$. This setting then affects hydraulic controls 550 (e.g., the hydraulic pitch system 300) and causes the cylinder to change its position $x_p$—e.g., the piston rod moves relative to the cylinder—thereby causing a corresponding movement in a blade actuator 555 which sets the pitch of the blade. In one embodiment, the moment on the blade $M_{blade}$ is the moment around the center axis of the blade. As shown, the moment $M_{blade}$ can affect the hydraulic cylinder with a force which affects the pressure in both chambers.

Figure 6:
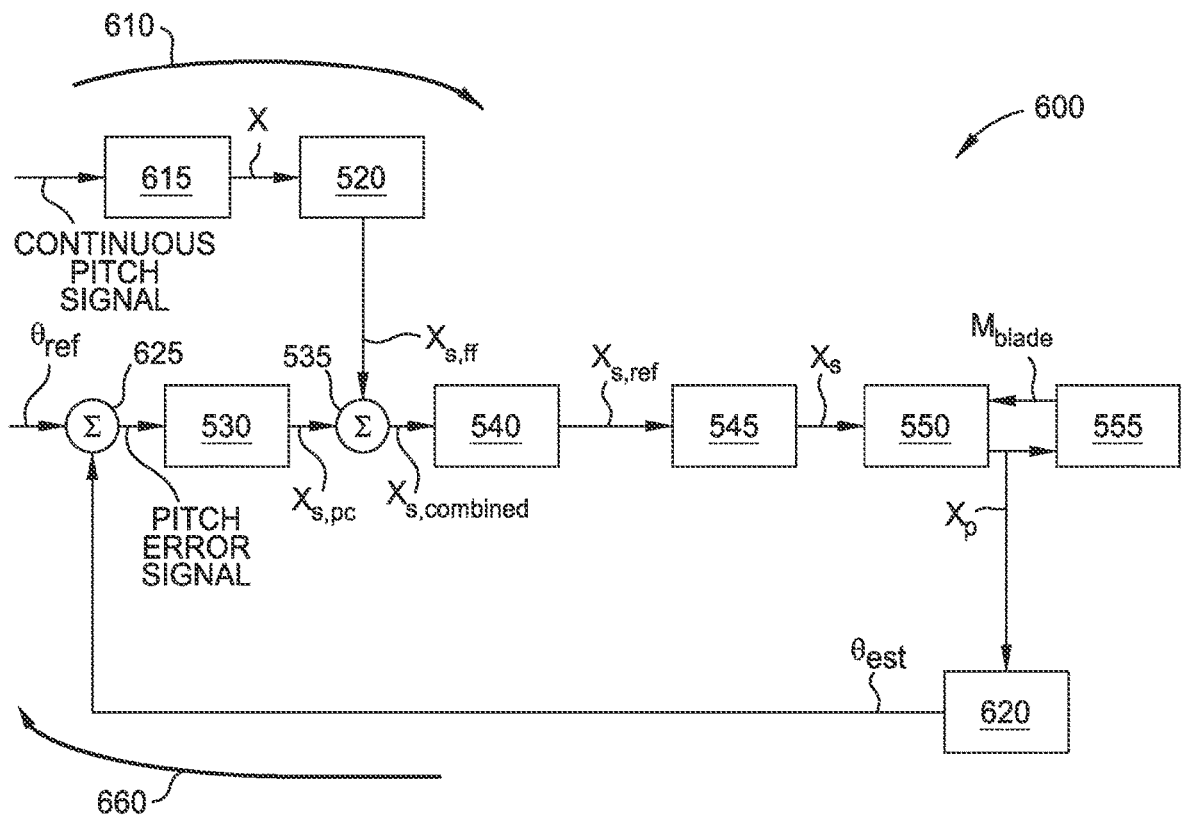
FIG. 6 illustrates a control system for controlling a hydraulic pitch system using a fed-forward velocity, according to an embodiment described in this present disclosure.

FIG. 6 illustrates a blade pitch control system 600 for controlling a hydraulic pitch system using a fed-forward velocity, according to an embodiment described in this present disclosure. The control system 600 includes many of the same components as the control system 500 and like reference numbers are used to indicate these similarities. Because these components perform a similar function, they are not described in detail here.

The control system 600 includes a feed-forward path 610 which includes a velocity calculator 615 and the gain control 520 for feed-forwarding a valve spool position $x_{s,ff}$ similar to the control system 500. However, the spool value position is calculated differently. In FIG. 5, the velocity calculator 515 derives the reference velocity of the hydraulic cylinder from the reference position setting of the hydraulic cylinder which is a sampled signal that is provided at intervals. In the control system 600, however, the velocity calculator 615 derives the hydraulic cylinder from a continuous pitch signal. That is, unlike a velocity derived from a sampled reference pitch or position value, the continuous pitch signal is a continuous signal (e.g., a sine or cosine signal) which is differentiable. The continuous pitch signal can be a cyclic pitch signal, a ramp rate, or any other continuous signal in the wind turbine controller that can be used to derive a reference velocity of the hydraulic cylinder.

Moreover, instead of identifying the reference position of the hydraulic cylinder, the control system 600 inputs the reference pitch angle ($\theta_{ref}$) directly into a summation module 625 which compares the reference pitch angle to an actual pitch angle ($\theta_{est}$) provided by a feedback loop 660. The actual pitch angle is derived by a pitch converter 620 which converts the actual position of the hydraulic cylinder $x_p$ to the actual or current pitch angle of the blade. The result of comparing the reference pitch angle to the actual pitch angle results in a pitch error signal that is provided to the pitch controller 530 whose output is then combined with the valve spool position provided by the feed-forward path 610.

Some non-limiting advantages of the control systems 500 and 600 in FIGS. 5 and 6 include improved controller response for varying pitch reference angles—i.e., better tracking in terms of smaller error versus reference for ramp input, a lower feedback loop gain which may improve stability margins, and no additional sensors compared to previous solutions—i.e., does not require multiple pressure sensors for the chambers in the hydraulic cylinder.

Figure 7:
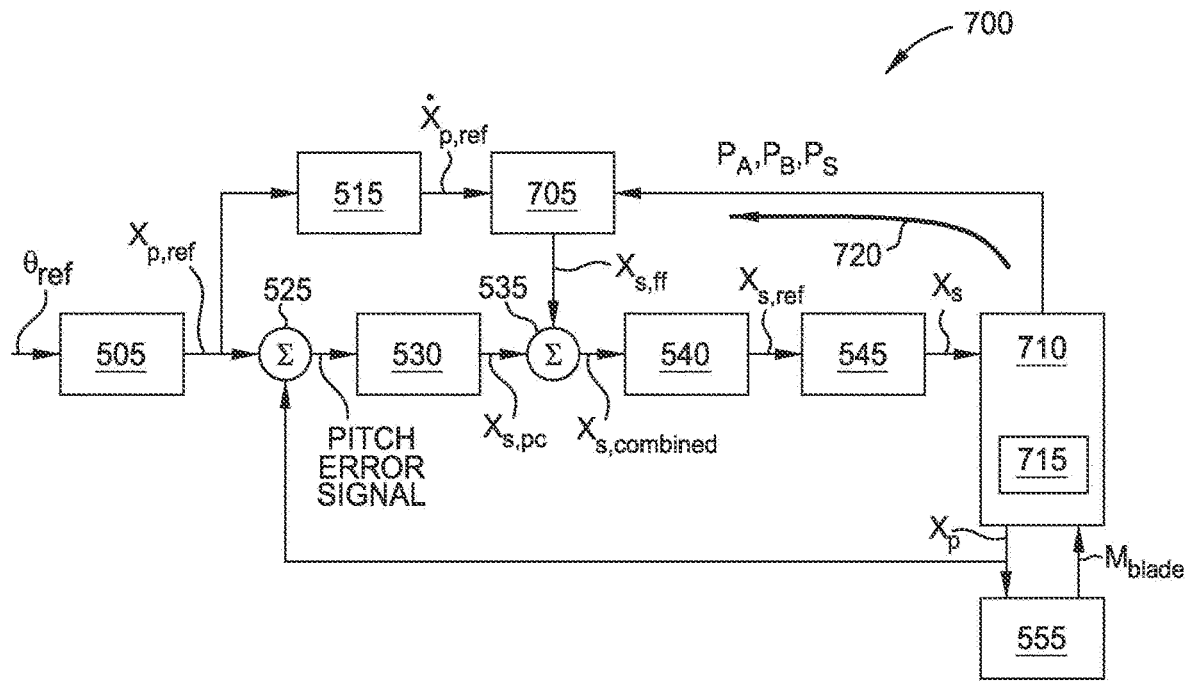
FIG. 7 illustrates a control system with active gain control in the feed-forward path, according to an embodiment described in this present disclosure.

FIG. 7 illustrates a blade pitch control system 700 with active gain control in the feed-forward path, according to an embodiment described in this present disclosure. The control system 700 is similar to the control system 500 in FIG. 5 where a reference pitch angle is converted into a reference velocity and then into a valve spool position which is then fed forward and combined with the spool position value generated by the pitch controller 530. As such, the control system 700 includes many of the same components as the control system 500 and like reference numbers are used to indicate these similarities. Because these components perform a similar function, they are not described in detail here.

Instead of using a predefined flow gain when calculating the valve spool position, the control system 700 includes an active gain control 705 which dynamically calculates the flow gain and then combines that flow gain with the reference velocity of the hydraulic cylinder generated by the velocity calculator 515. That is, unlike in the control system 500 where the gain control 520 relies on one or more predefined (or constant) flow gains $K_{ff}$, the control system 700 dynamically calculates the flow gain using a feedback path 720. Specifically, the control system 700 includes hydraulic controls 710 which include multiple chamber pressure sensors 715. For example, the hydraulic controls 710 may include a first sensor that measures the pressure in Chamber A ($P_A$) and a second sensor the measures the pressure in Chamber B ($P_A$). Thus, unlike the control systems 500 and 600 which may include only one pressure sensor, the control system 700 includes pressure sensors for each chamber in the hydraulic cylinder. Further, the controls 710 may include a third sensor that measures the pressure generated by the pump ($P_S$) in the hydraulic pitch system. As shown by the feedback path 720, the pressures are fed back to the active gain control 705 which can dynamically calculate the flow gain of the hydraulic cylinder.

For example, Equation 1 and 2 can be combined to yield:

$$\dot{x}_p \cdot A_A = C_D A(x_s) \sqrt{\frac{2}{\rho}(P_s - P_A)} \tag{8}$$

While Equation 8 is expressed in terms of Chamber A, the following equation can be used for Chamber B when there is negative velocity (e.g., when the piston rod travels in the other direction):

$$\dot{x}_p \cdot A_B = C_D A(x_s) \sqrt{\frac{2}{\rho}(P_s - P_B)} \tag{9}$$

s Equations 8 and 9 can be simplified to define a dynamic flow gain $K_\gamma$ as shown in Equations 10 and 11, respectively.

$$\dot{x}_p \cdot A_A = K_\gamma \sqrt{(P_s - P_A)} \text{ where } K_\gamma = C_D A' \sqrt{\frac{2}{\rho}} \tag{10}$$

$$\dot{x}_p \cdot A_B = K_\gamma \sqrt{(P_s - P_B)} \text{ where } K_\gamma = C_D A' \sqrt{\frac{2}{\rho}} \tag{11}$$

Equations 10 and 11 can be modified to generate the spool position value when the piston rod has a positive velocity (Equation 12) and when the piston rod has a negative velocity (Equation 13).

$$x_{s,ff} = \frac{A_A}{K_\gamma \sqrt{(P_s - P_A)}} \dot{x}_{p,ref} \tag{12}$$

$$x_{s,ff} = \frac{A_B}{K_\gamma \sqrt{(P_s - P_B)}} \dot{x}_{p,ref} \tag{13}$$

Using Equations 12 and 13, the active gain control 705 can calculate the valve spool position for negative and positive velocities of the hydraulic cylinder (which may use the same or different values of the dynamic flow gain $K_\gamma$). As discussed above, the valve spool position provided by the active gain control 705 is then combined with the valve spool position outputted by the pitch controller 530. This combined value is then used to change the spool setting, thereby changing the position of the hydraulic cylinder.

Figure 8:
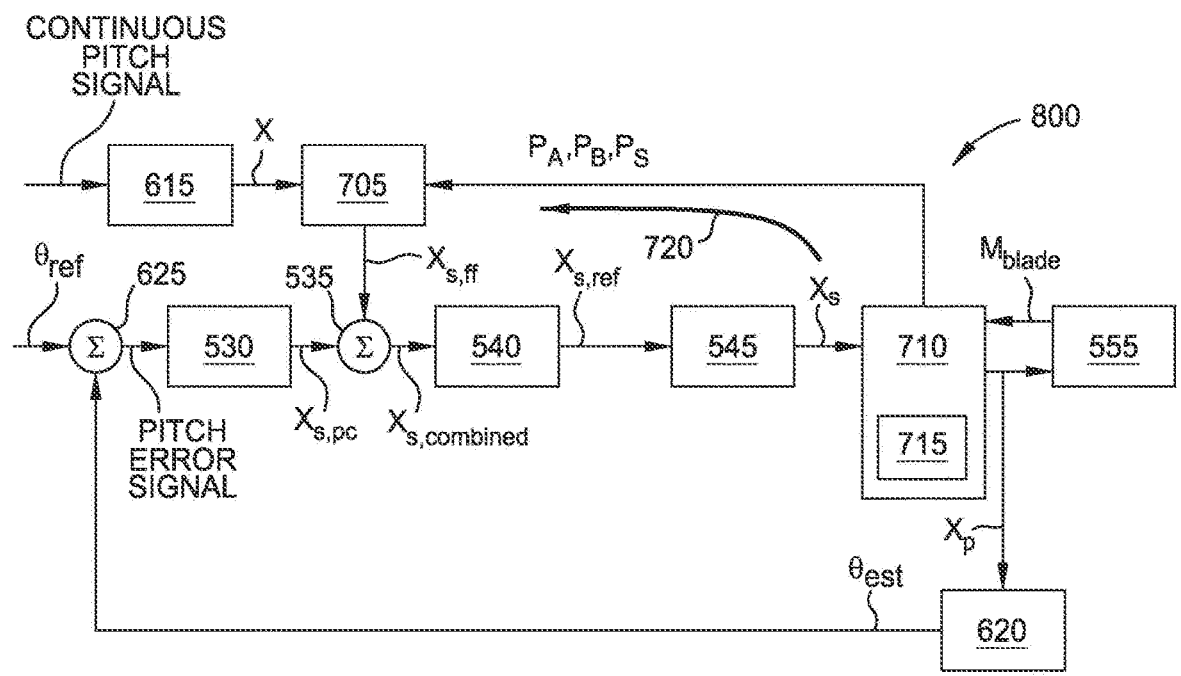
FIG. 8 illustrates a control system with active gain control in the feed-forward path, according to an embodiment described in this present disclosure.

FIG. 8 illustrates a blade pitch control system 800 with active gain control in the feed-forward path, according to an embodiment described in this present disclosure. The control system 800 is similar to the control system 600 in FIG. 6 where a continuous pitch signal is converted into a velocity and a valve spool position which is then fed forward and combined with the spool value position generated by the pitch controller 530. As such, the control system 800 includes many of the same components as the control system 600 and like reference numbers are used to indicate these similarities.

Because these components perform a similar function, they are not described in detail here.

Like the control system 700, the control system 800 includes the active gain control 705 which dynamically calculates the flow gain and then combines that flow gain with the velocity of the hydraulic cylinder generated by the velocity calculator 515 instead of using a predefined flow gain when calculating the valve spool position $x_{s,ff}$. That is, the control system 800 dynamically calculates the flow gain $K_\gamma$ using the feedback path 720. Specifically, the control system 700 includes hydraulic controls 710 which include multiple chamber pressure sensors 715. For example, the hydraulic controls 710 may include a first sensor that measures the pressure in Chamber A ($P_A$) and a second sensor the measures the pressures in Chamber B ($P_A$).

Further, the controls 710 can include a third sensor that measures the pressure generated by the pump ($P_S$) in the hydraulic pitch system. As shown by the feedback path 720, the pressures are fed back to the active gain control 705 which can dynamically calculate the flow gain of the hydraulic cylinder as described above in FIG. 7.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A method of controlling a pitch of a blade in a wind turbine, comprising:
   receiving a reference pitch angle;
   comparing at least one of the reference pitch angle and a signal derived therefrom to a hydraulic actuator position of the wind turbine to output a pitch error signal;
   generating, based on the pitch error signal, a first setting for the hydraulic actuator, wherein the hydraulic actuator controls the pitch of the blade;
   generating a second setting for the hydraulic actuator based on at least one of a reference velocity and a reference acceleration of the hydraulic actuator;
   combining the first and second settings to output a combined setting; and
   controlling the hydraulic actuator based on the combined setting.

2. The method of claim 1, wherein generating the second setting for the hydraulic actuator comprises:
   adjusting the reference velocity using a predefined feedforward gain to generate the second setting, wherein the feedforward gain is based on a cross sectional area of the hydraulic actuator.

3. The method of claim 2, wherein the feedforward gain is based on a cross sectional area of at least two chambers in the hydraulic actuator, wherein the feedforward gain is the same regardless whether the hydraulic actuator is currently moving in a first direction or a second, opposite direction.

4. The method of claim 2, wherein the feedforward gain is based on a cross sectional area of at least two chambers in the hydraulic actuator, wherein the feedforward gain is different depending on whether the hydraulic actuator is currently moving in a first direction or a second, opposite direction.

5. The method of claim 1, further comprising:
   estimating the reference velocity of the hydraulic actuator based on the reference pitch angle and at least one historical value of the reference pitch angle.

6. The method of claim 1, further comprising:
   estimating the reference velocity of the hydraulic actuator based on a continuous pitch signal in a control system of the wind turbine.

7. The method of claim 1, further comprising:
   receiving a first pressure measurement from a first chamber in the hydraulic actuator;
   receiving a second pressure measurement from a second chamber in the hydraulic actuator;
   receiving a third pressure measurement from a pump supplying fluid to the hydraulic actuator; and generating a feedforward gain based on the first, second, and third pressure measurements and on a cross sectional area of the hydraulic actuator; and adjusting the reference velocity using the feedforward gain to generate the second setting.

8. A control system for controlling a pitch of a blade in a wind turbine, the control system comprising:

a hydraulic actuator configured to control the pitch of the blade;

a first summation module configured to compare at least one of a reference pitch angle and a signal derived therefrom to a hydraulic actuator position of the wind turbine to output a pitch error signal;

a pitch controller configured to generate, based on the pitch error signal, a first setting for the hydraulic actuator;

a feed-forward path configured to generate a second setting for the hydraulic actuator, wherein the second setting is based on at least one of a reference velocity and a reference acceleration of the hydraulic actuator;

a second summation module configured to combine the first and second settings to output a combined setting; and hydraulic controls configured to control the hydraulic actuator based on the combined setting.

9. The control system of claim 8, wherein generating the second setting for the hydraulic actuator comprises:

adjusting the reference velocity using a predefined feedforward gain to generate the second setting, wherein the feedforward gain is based on a cross sectional area of the hydraulic actuator.

10. The control system of claim 9, wherein the feedforward gain is based on a cross sectional area of at least two chambers in the hydraulic actuator, wherein the feedforward gain is the same regardless whether the hydraulic actuator is currently moving in a first direction or a second, opposite direction.

11. The control system of claim 9, wherein the feedforward gain is based on a cross sectional area of at least two chambers in the hydraulic actuator, wherein the feedforward gain is different depending on whether the hydraulic actuator is currently moving in a first direction or a second, opposite direction.

12. The control system of claim 8, further comprising:

a velocity calculator in the feed-forward path configured to estimate the reference velocity of the hydraulic actuator based on the reference pitch angle and at least one historical value of the reference pitch angle.

13. The control system of claim 8, further comprising:

a velocity calculator in the feed-forward path configured to estimate the reference velocity of the hydraulic actuator based on a continuous pitch signal in a control system of the wind turbine.

14. The control system of claim 8, further comprising:

a first sensor configured to output a first pressure measurement from a first chamber in the hydraulic actuator;

a second sensor configured to output a second pressure measurement from a second chamber in the hydraulic actuator;

a third sensor configured to output a third pressure measurement from a pump supplying fluid to the hydraulic actuator; and an active gain control in the feed-forward path configured to:

generate a feedforward gain based on the first, second, and third pressure measurements and on a cross sectional area of the hydraulic actuator, and adjust the reference velocity using the feedforward gain to generate the second setting.

15. A computer-readable storage medium storing instructions, which, when executed on a processor, perform an operation for controlling a pitch of a blade in a wind turbine, the operation comprising:

receiving a reference pitch angle;

comparing at least one of the reference pitch angle and a signal derived therefrom to a hydraulic actuator position of the wind turbine to output a pitch error signal;

generating, based on the pitch error signal, a first setting for the hydraulic actuator, wherein the hydraulic actuator controls the pitch of the blade;

generating a second setting for the hydraulic actuator based on at least one of a reference velocity and a reference acceleration of the hydraulic actuator;

combining the first and second settings to output a combined setting; and controlling the hydraulic actuator based on the combined setting.

16. The computer-readable storage medium of claim 15, wherein generating the second setting for the hydraulic actuator comprises:

adjusting the reference velocity using a predefined feedforward gain to generate the second setting, wherein the feedforward gain is based on a cross sectional area of the hydraulic actuator.

17. The computer-readable storage medium of claim 16, wherein the feedforward gain is based on a cross sectional area of at least two chambers in the hydraulic actuator, wherein the feedforward gain is the same regardless whether the hydraulic actuator is currently moving in a first direction or a second, opposite direction.

18. The computer-readable storage medium of claim 16, wherein the feedforward gain is based on a cross sectional area of at least two chambers in the hydraulic actuator, wherein the feedforward gain is different depending on whether the hydraulic actuator is currently moving in a first direction or a second, opposite direction.

19. The computer-readable storage medium of claim 15, further comprising:

estimating the reference velocity of the hydraulic actuator based on the reference pitch angle and at least one historical value of the reference pitch angle.

20. The computer-readable storage medium of claim 15, further comprising:

estimating the reference velocity of the hydraulic actuator based on a continuous pitch signal in a control system of the wind turbine.

* * * * *